Dec. 17, 1940.   G. C. WILHIDE   2,225,091
PORTABLE POWER DRIVEN SCREW OR BOLT DRIVING AND NUT RUNNING MACHINE
Filed July 31, 1937   4 Sheets-Sheet 1
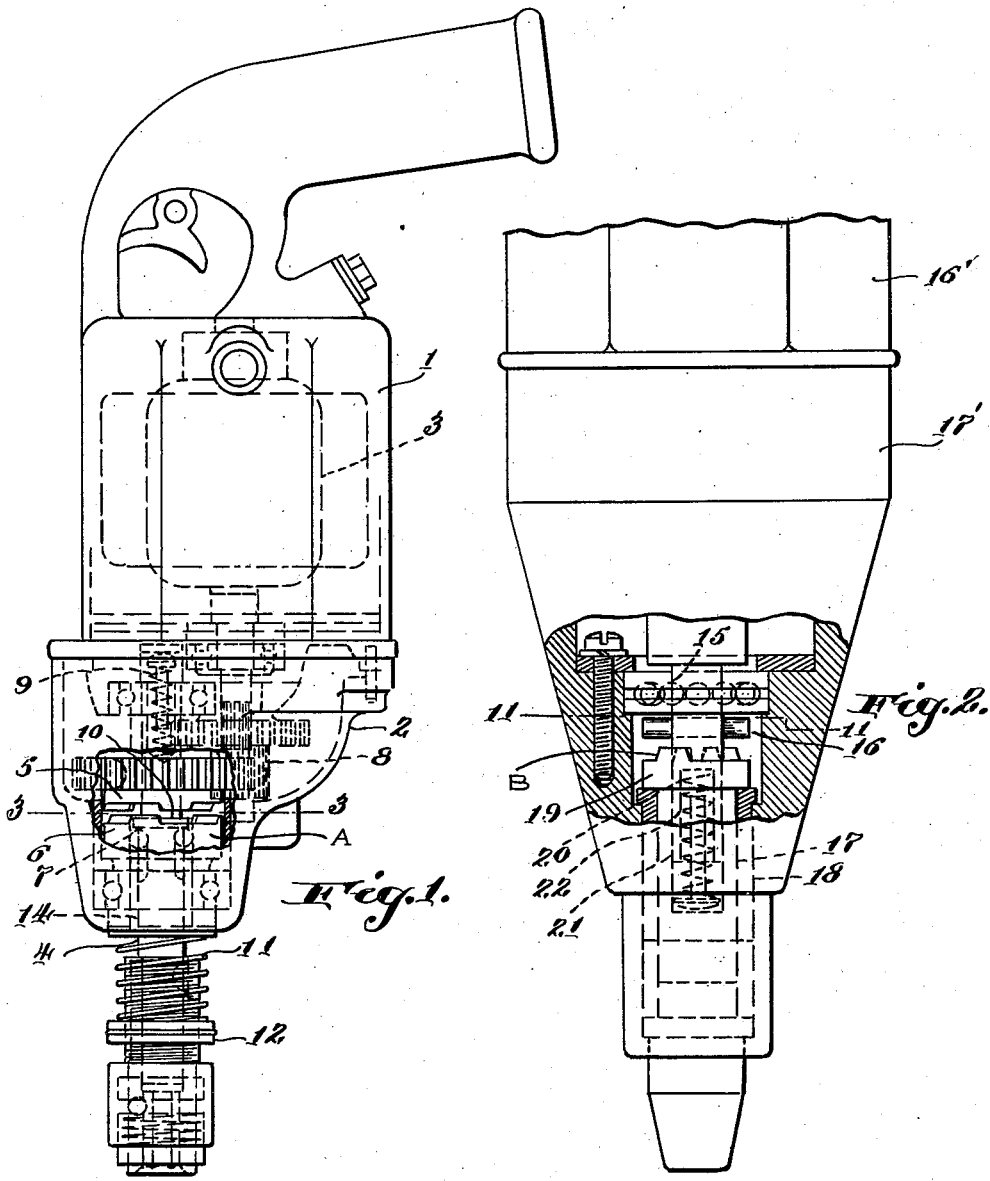

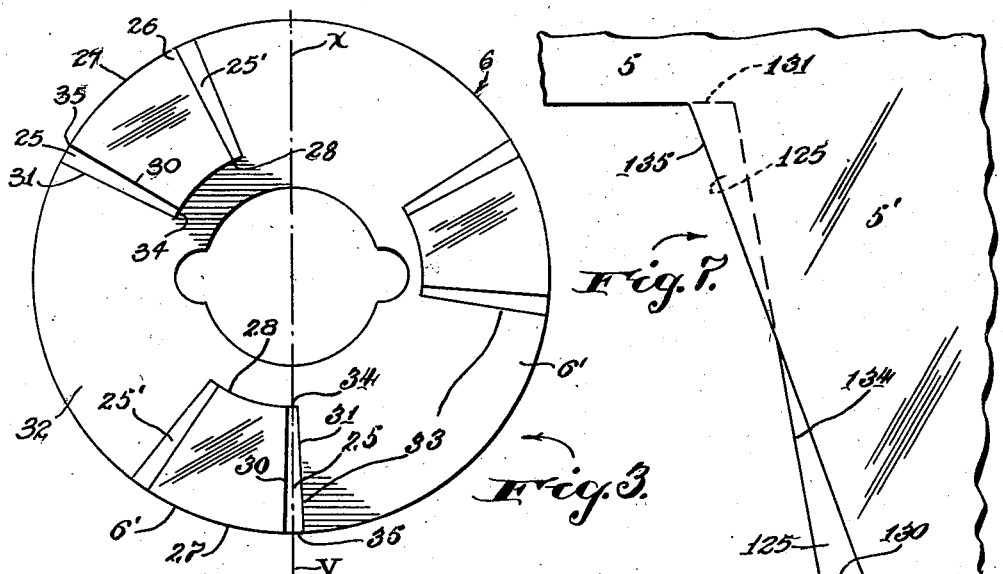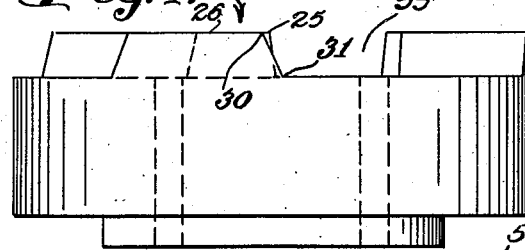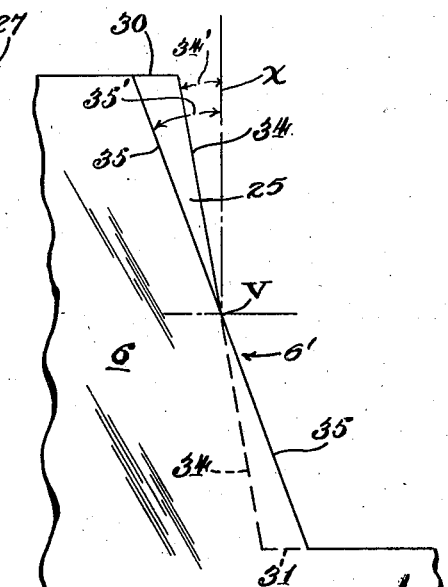

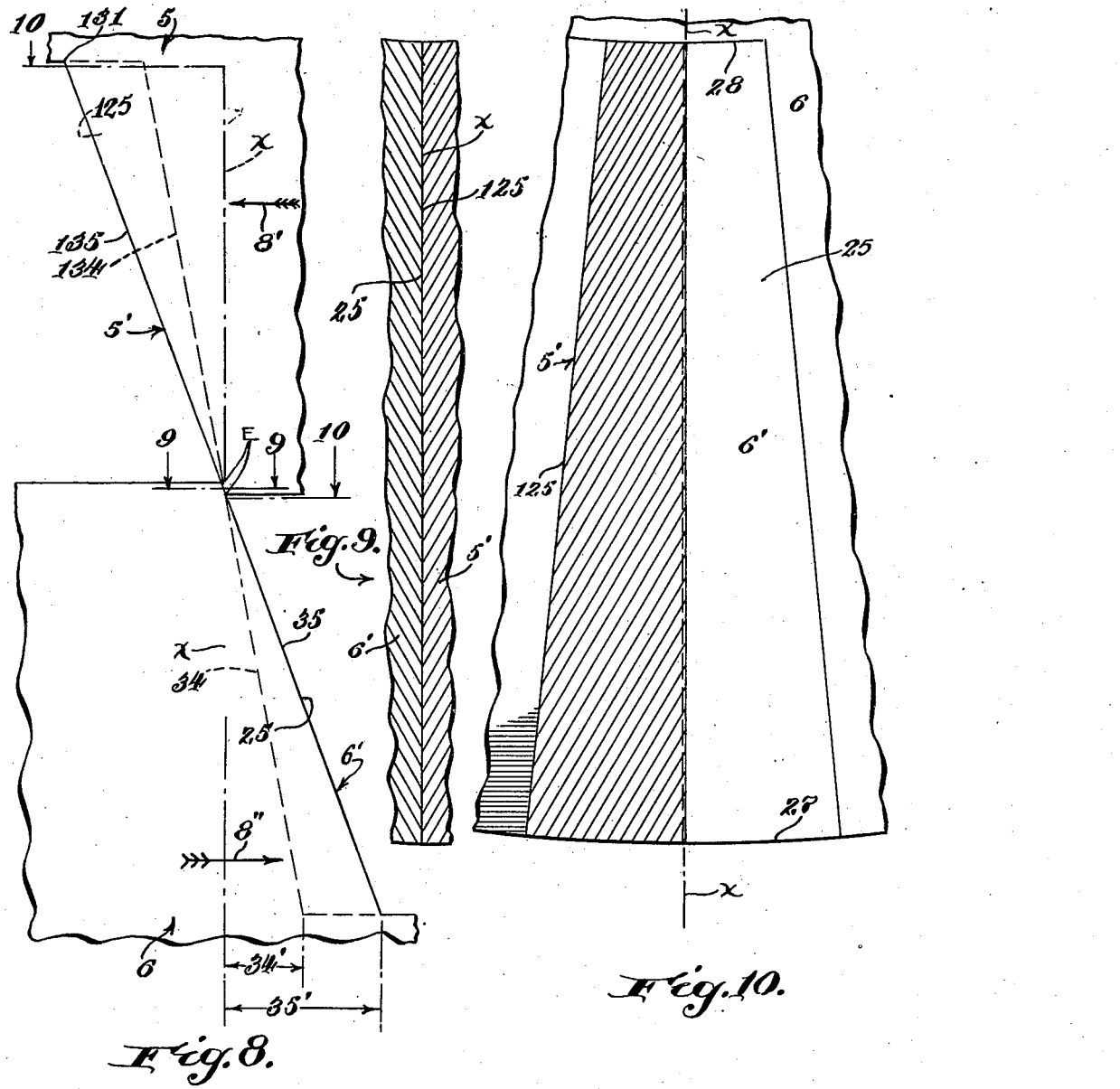

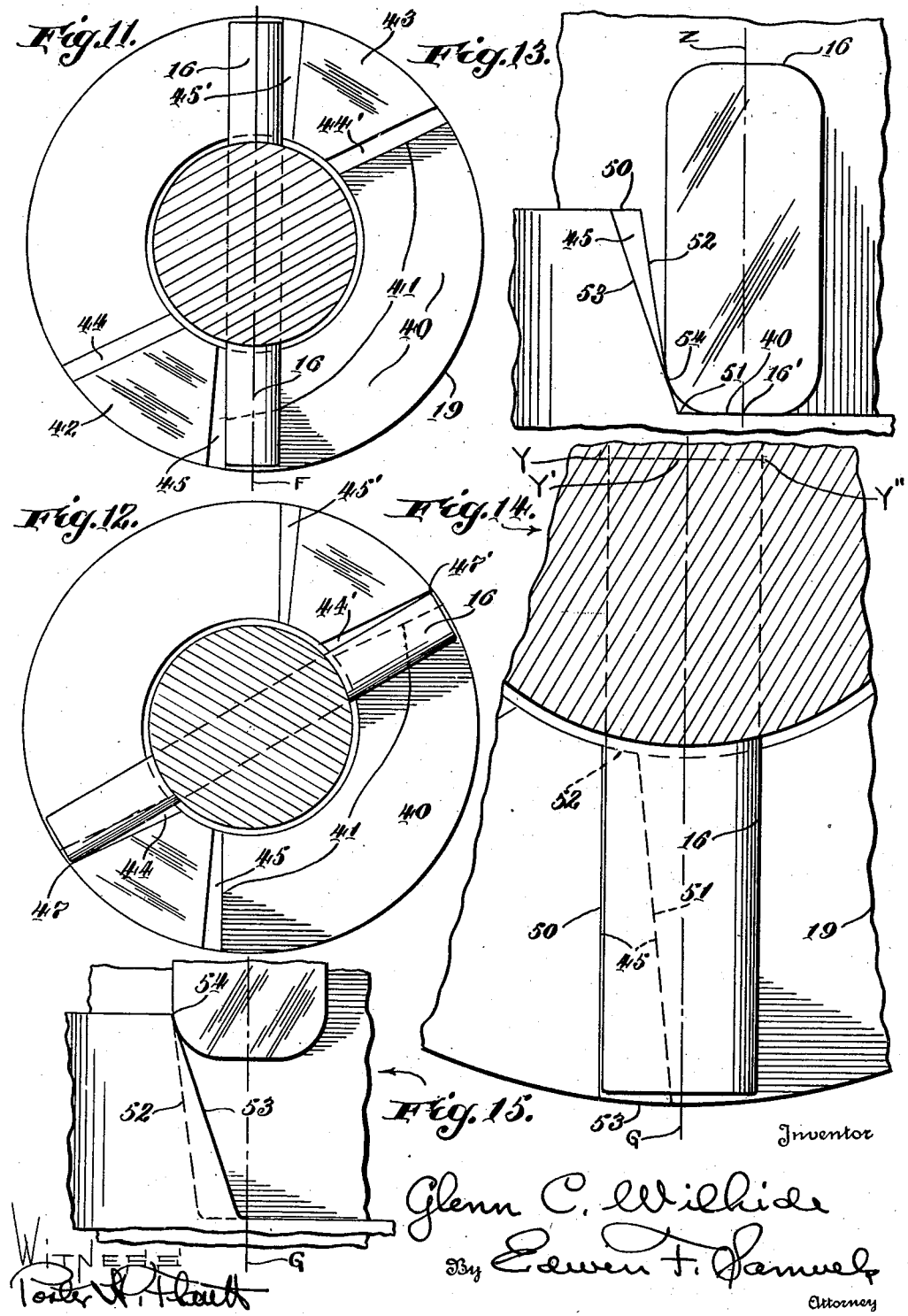

Patented Dec. 17, 1940

2,225,091

UNITED STATES PATENT OFFICE 2,225,091

PORTABLE POWER DRIVEN SCREW OR BOLT DRIVING AND NUT RUNNING MACHINE

Glenn C. Wilhide, Towson, Md., assignor to The Black & Decker Manufacturing Company, a corporation of Maryland Application July 31, 1937, Serial No. 156,700

12 Claims. (Cl. 192—30.5)

The invention relates to manually portable power-driven tools and more particularly to tools of the nut runner and screw and bolt driving type. In this type of tool satisfactory operation generally requires a definite angular relation between the work and the bit so that a dead or normally released spindle is desirable to permit free turning of the bit to the proper angle prior to its engagement with the work.

For this purpose a normally released jaw or toothed clutch is provided in the drive between the motor and the spindle, the most convenient arrangement comprising one in which the movable clutch member is mounted on the spindle which is slidably mounted and normally advanced by means of a spring whereby the clutch member carried by the spindle is maintained in a normally disengaged position, being engaged by the pressure of the tool against the work, the working pressure serving to compress the spring and retract the spindle and thus engage the clutch.

Such a device is frequently employed to give a ratcheting-in action at the end of the nut, screw, or bolt-setting operation when it is desired to utilize the momentum of the rotating parts to complete the setting of the nut, screw or bolt. In this way a torque which is much beyond the normal torque of the motor may be applied to the work when desired. This action is seldom entirely absent from the operation of such tools. This ratcheting is accomplished by maintaining the bit in engagement, applying just the right pressure to the tool to cause the clutch repeatedly to engage and disengage. This gives a hammering action which is apt to be destructive of the tooth surfaces, particularly the points and edges which are first and last in contact in the engaging and disengaging operation.

In addition to the dead spindle feature, many of the tools now in use for driving and setting screws, bolts, and nuts include an overload release which may be accomplished either by means of the same clutch or by additional toothed clutch means, one member of the clutch being supported in engaged position by means of a spring which yields at a pre-determined torque permitting the clutch to open, releasing the driving connection between the motor and the spindle.

In connection with this overload releasing spring an adjustment is usually provided to regulate the maximum torque applied to the work; but with the type of tool provided with the overload release, if the tool is held in engagement with the work after the release takes place, it is still possible to effect a vibratory or hammering action of the clutch due to its repeated engagement and disengagement; in fact, this operation may at times be utilized as explained to obtain additional setting of the screws, nuts, or bolts, placing an extremely heavy duty on the clutch teeth with a tendency to the destructive results already outlined.

While the dead spindle and overload releasing clutch are frequently combined in the same tool, either one may be used separately for purposes and with limitations understood in the art, and it is also possible to use the dead spindle clutch with other means for limiting the torque. In some instances these overload devices are not of the clutch type.

It has been customary in this art to make the teeth or jaws by milling out portions of the clutch body, leaving the raised jaws or teeth—either term being used to indicate these members—with their respective sides or engaging surfaces each in a substantially flat plane inclined to the longitudinal plane of the axis, it being understood that inclination of the power-transmitting surfaces of the tooth relatively to the plane of rotation; i. e.; tapering of the teeth, is necessary to an overload release at a pre-determined torque and highly desirable, if not essential, to the dead spindle clutch even when it is used solely for the purpose of obtaining a normal release, as the tapering of the teeth toward their axial ends, which are forward in the direction of engagement, provides for quick and easy engagement and release of the respective clutch members.

In some instances, a diametrically-arranged pin is substituted for one clutch member, but the tooth surfaces of all these prior art teeth are, or tend to be, in the instance of each tooth parallel to a single radius in or near that tooth.

An important difficulty with the clutch teeth made in accordance with the present and previously existing practice, and having their engaging or power-transmitting surfaces inclined more or less parallel to a single radius, is that as the two members of the clutch separate in releasing one member rotates relatively to the other; i. e., the driving member advances on the driven member in the direction of rotation. This occurs in the release of any jaw clutch having inclined tooth surfaces on either clutch member; but when the engaging surfaces of each tooth of a pair of opposed teeth are parallel or nearly parallel to a single radius in or adjacent that tooth, the contact as the clutch members separate and change their angular relation changes from a complete surface contact, if they are designed to give such a contact when fully engaged, to a line contact at the outer edges of the teeth which in a circular clutch member would be located in or near a cylindrical or approximately cylindrical path concentric with the clutch axis. Just before the end of the disengaging action this line contact changes to a point contact. In other words, the length of the line contact, as aforesaid, decreases as the clutch continues to disengage until it becomes a point contact immediately prior to release.

Under these circumstances, the pressure per unit of area at the point of contact becomes very high and there is a marked tendency to wear and destroy the radial or substantially radial edges of the jaws at the outer ends of the teeth; and because of the repeated impacts and equally repeated disengagements under pressure this destructive action progresses with considerable rapidity as compared to the normal life of the other parts of the tool, being known as a "spawling off" action, the result being a badly battered jaw and one that is rounded over so that it often releases too quickly, both in the action of the overload release and dead spindle release.

The primary object of the invention is to overcome these and other difficulties in clutch tooth operation, particularly in the operation of nut-running, bolt and screw-driving machines. The invention in the preferred form provides a generated toothed clutch which will give a full and complete contact throughout the overlapping area of the teeth, being reduced as the clutch members are relatively withdrawn in releasing, and finally reduced at the time of release to a line contact which is transverse to the axis; i. e., in the direction of the radial length of the tooth, the contact between the teeth being at no time reduced to a point contact as in the previous types of clutch teeth. And while the invention has particular relation to screw and bolt-setting and nut-running tools of the manually portable power-driven type, it is capable, in the broader conception, of more general application.

The invention is also applied to other types of clutch in which the contact in fully-closed position of the clutch may be less complete, the teeth on one clutch member being plain or conventional; but at the time of release there is a line contact extending in the direction of the radial length of the tooth and the contact is not reduced beyond this at any time.

In the accompanying drawings, I have illustrated a portable power-driven tool of the nut-running, bolt-setting, and screw-driving type equipped with the generated toothed clutch in accordance with the invention. I have also illustrated in detail both the preferred clutch having a pair of toothed members with full contact for the entire overlap of the transmitting surfaces, and a type of clutch in which one clutch member only has the generated tooth of the invention.

In the drawings:

Figure 1 is a side elevation of a nut and bolt-setting and screw-driving machine of the portable power-driven type, having a jaw clutch with a plurality of toothed members arranged to give both the dead spindle and overload releasing operation, the casing being broken away in the vicinity of the clutch to show the latter in elevation.

Figure 2 is a fragmentary elevation on an enlarged scale of a tool or machine adapted to the same purposes, having the clutch arranged for the dead spindle operation but also adapted to give on overload release by manual control of the working pressure applied to the tool. This tool has a conventional type of tooth on one clutch member illustrated in the form of a pin, and the novel transmitting surface on the other clutch member.

Figure 3 is a plan view on an enlarged scale looking downwardly from the plane indicated by the line 3—3 in Fig. 1, this may be treated as showing either or both clutch members having the improved generated power-transmitting surface, though the details of the shaft opening relate particularly to the lower clutch member in Figure 1.

Figure 4 is a side elevation of the same.

Figure 5 is a fragmentary side elevation on a further enlarged scale looking in the direction of the radius indicated by V in Figure 3 and showing the contacting portions of corresponding teeth of the two clutch members in fully engaged position.

Figure 6 is a fragmentary elevation similar to Figure 5 and taken from the same point of view, showing a similar fragment of a tooth of the lower clutch member disengaged.

Figure 7 is a similar fragmentary elevation from the same viewpoint of the corresponding and opposed surfaces of a tooth of the upper clutch member, the portions shown being similar to the corresponding portions in Figure 5.

Figure 8 is a view which may be treated as also taken in the direction of line V, Figure 3, and on the same scale as Figure 5 and also of a fragmentary nature, showing the opposed surfaces of the teeth of the upper and lower member, one of said members having been withdrawn in the direction of the clutch axis to a position closely approaching the position of disengagement, and said members being treated for purposes of illustration as having been rotated one toward the other in the direction of the arrows 8'—8'' to maintain the engagement of the teeth, the zone of engagement being reduced almost to a radial line near the axial plane X of line V.

Figure 9 is a narrow fragmentary section on the line 9—9 of Figure 8 on each side of plane X showing the median line of contact extending throughout the radial length of the teeth.

Figure 10 is a section on the line 10—10 in Figure 8, looking downwardly in the direction of the arrows, said line being offset in the axial plane indicated by X in Figure 3 and showing the generated power transmitting surface of the bottom tooth in plan.

Figure 11 is a section on the line 11—11 in Figure 2 looking downwardly and showing a toothed bottom clutch member with the substantially helical generated power-transmitting surfaces of the invention, the upper clutch member being shown as of the pin type, and shown in the fully-engaged position of the pin with the generated power-transmitting surfaces of the teeth of the lower member, the bottom clutch member having the conventional type of tooth surface on the back or opposite sides of the teeth from those shown as engaged by the pin.

Figure 12 is a similar view, showing the pin in contact with the opposite surfaces of the teeth; i. e., the conventional type of surface, and in final disengaging position.

Figure 13 is a fragmentary elevation on an enlarged scale looking in the direction of the radius F in Figure 11 and showing the pin in full engagement with the toothed member as in Figure 11; i. e., at the bottom of the notch between the teeth.

Figure 14 is a plan showing the pin substantially in the final position in the operation of becoming disengaged from a power-transmitting generated surface of the tooth, one member having been moved away from the other in the direction of the clutch axis and the toothed member being treated as having been rotated in left-handed rotation from the position in Figures 11 and 13 oppositely to the direction of drive, to maintain the contact, showing that the line contact throughout the radial length of the tooth is maintained up to the time of disengagement which normally takes place by the passing of the pin forwardly over the tooth.

Figure 15 is a view taken in the direction of the radius G in Figure 14, showing the pin in disengaging position as in Figure 14; i. e., in contact with the upper edge of the tooth throughout the length of the latter in a direction parallel to the radius.

Referring to the drawings by numerals, the construction in Figure 1 comprises a motor housing or casing 1 and gear casing 2, the motor housing enclosing an electric motor 3 indicated in broken lines. The construction also includes a spindle 4 and a jaw clutch having upper and lower toothed members 5 and 6. The spindle is passed through the upper member which is free to rotate thereon and is keyed to the lower member by means of balls 7 or in any other suitable manner to slide on the spindle. The upper clutch member 5 is driven from the motor by a train of gears 8; and the spindle 4, which is mounted to slide in the direction of its length, is given a downward tendency by the spring 9 which serves to hold the clutch 5—6 normally released to give the dead spindle effect described. The lower clutch member 6, being slidably mounted, is advanced against the shoulder 10 by the spring 11 which bears against the adjustable collar 12 on the spindle and, at its opposite end, against the sliding sleeve 14 which transmits the thrust of the spring to the lower clutch member 6, giving an automatic overload release substantially at the torque determined by the adjustment of the spring 11. The collar 10 limits the upward motion of the member 6 along the spindle 4. The clutch members 5, 6 are referred to as clutch A.

Figure 2 illustrates the cooperation of a conventional tooth shown as a pin with the generated tooth of the invention. This figure shows a tool for the purposes of the one previously described. This tool has a shaft 15 driven by an electric motor in the housing 16' through a train of gearing in the gear casing 17'. The shaft 15 carires an upper toothed clutch member shown in the form of a transverse clutch pin 16 passed through the shaft and projecting therefrom horizontally or transversely. The shaft 15 enters the upper end of a hollow spindle 17 which is mounted to slide in suitable bearings 18. The lower clutch member 19 is secured to the upper end of spindle 17. The lower end of the shaft 15 is also hollow and contains a spring 20 which bears at one end against the bottom of the hollow or opening 21 in the spindle 17 and at its other end against the top of the opening 22 in the shaft 15. The spindle 17, being mounted to slide, is normally advanced by said spring, the clutch 16—19 referred to as clutch B being thus held normally released which gives the dead spindle effect previously discussed. The clutch is engaged at the beginning of each operation by the pressure of the bit against the work, which retracts the spindle, bringing the teeth of the clutch member 19 into engagement with the pin 16 or vice-versa, as best illustrated in Figure 13 to be further described.

Figures 1 and 2 are examples of the application of the improved clutch of the invention, and the inventive combination of this clutch with the elements of this type of tool, it being understood that its use in the various tools of this general type for the purposes stated and in other combinations is contemplated. While the clutch members, Figures 3 to 10, are shown as having three teeth to each member, the number of teeth is immaterial, and the description will be confined to a single tooth, one on the upper and one on the lower; i. e., the driving and driven clutch members of clutch A. The tooth 6' of the lower clutch member 6 has a generated power-transmitting surface 25; the opposite surface 25', being shown as similar to the surface 25 but oppositely inclined, may in the average tool either be generated according to the present invention or of the conventional type.

The words power transmitting and driving as applied to the tooth surfaces are used interchangeably.

The teeth are in a general way of reducing taper toward their axial ends which are forwardly in the direction of closing, which is also true of the conventional teeth of the prior art. The teeth in the form shown are, for convenience of description and illustration, of a length in a substantially radial direction equal to half the radius of the clutch member 6 and, in the form shown, have a flat-top or upper surface 26 in a plane at right angles to the axis of the clutch member. The teeth 6' and also the teeth 5' have an inner curved substantially cylindrical surface 28 and an outer curved or cylindrical surface 27 shown as having a radius twice the radius of surface 28. The surfaces other than the power-transmitting and engaging surfaces 25 and 25' are no part of the invention and are determined according to the previous practice.

The engaging or power-transmitting surface 25, to which the surface 25' may be similar but oppositely inclined, the two surfaces converging in the direction of clutch engagement, is bounded by an upper radially extending edge 30 (Figs. 1, 3 and 6) and a lower boundary 31 which represents the intersection of the surface 25 with the bottom wall 32 of the notch or space 33 between adjacent teeth. The surface 25 is also bounded by inner and outer edges 34 and 35 respectively (Fig. 3), it being understood that these and all other edges may be rounded. The power-transmitting surface 25, in the preferred form shown, is inclined to the axis of the clutch at an angle which increases uniformly from the inner edge 34 to the outer edge 35 of this surface, the forward and rear edges in the direction of engagement, shown at the top and bottom edges 30 and 31, being radial in the clutch A and parallel or approaching parallelism to the corresponding radii in the clutch B to be described, some divergence from these angles without departure from the principles of the invention being contemplated.

The lines 30 and 31, representing the forward and rear or top and bottom edges of the power-transmitting surface, if continued or produced toward the center, would intersect the clutch axis, the surface 25 being, according to more precise interpretation of the theory of the invention which is capable of variation, a helically inclined surface generated about the axis of the clutch member, which surface if extended inwardly, would include and coincide with the axis, being deflected therefrom at a uniformly increasing angle outwardly from the center. A cylindrical section of this helical or theoretical tooth surface would at any radius give a line helically arranged about the clutch axis, which is the definition of the words "helical surface" as used herein, a greater or less departure from a strictly helical surface being contemplated.

The surface 25', which in the normal operation of the tool as shown would be subject to less wear, may be of this type or the conventional type. If surfaces 25 and 25' were made similar they would converge in the direction of engagement of the clutch member.

Figure 4 shows the lower clutch member in elevation but looking at the same from the outside in the direction of the median line V of said surface 25, said line being radial and at right angles to the axis. Figure 6 is a similar view on an enlarged scale. According to the more precise theory of the invention, all lines in surface 25 at right angles to the clutch axis would be radial.

Looking in the direction stated, the lower half of the edge 34 and surface 25 are concealed; and it will be noted (see Figures 6 and 8) in line with the theory already stated that the radial distance from the clutch axis at 34, being one-half the radial distance from the clutch axis at 35, the angle of the edge 34 with the axial plane X extending through the radius represented by the median line V is one-half the angle of the edge 35 with said plane. Conveniently, these angles are indicated as 34' and 35'. And looking at the tooth in the direction of the median line or radius V (Figures 3, 5, and 6) the lines representing these edges 34 and 35 cross at the center point V which in Figures 5 and 6 is an end elevation of said radial line V.

Figure 5 shows fragmentarily the upper and lower clutch members 5 and 6 in full engagement, the corresponding power-transmitting surfaces 25 and 125 being in contact throughout the area of both surfaces. The concealed inner edge 34 of the surface 25, and the corresponding edge 134 of surface 125 are therefore substantially coincident, the outer edges of these surfaces are indicated by 35 and 135 respectively and are also substantially coincident. The power-transmitting surfaces are shown in full contact; i. e., throughout the length of these edges and throughout their radial length.

Figure 7 illustrates the power-transmitting surface 125 of the tooth 5' of the upper clutch member 5 corresponding to the tooth 6', the surface 125 engaging the surface 25 of the tooth 6' in operation as shown in Figure 5. The inner and outer edges of the power-transmitting surface 125 being bounded by lines indicating edges 134 and 135 respectively at the inside and outside and 130 and 131 at the forward and rear axial ends, the surface 125, as already described, is similar to the surface 25 of the tooth 6' and capable of close contact therewith throughout its area when the clutch members are in full engagement according to the precise theory above outlined, it being understood that in the preferred form of the invention described the opposed power-transmitting surfaces of the upper and lower teeth, though similar, are opposite; and while two teeth have been described as in cooperation, it is understood that in the form shown every tooth of the upper clutch member may be brought in driving contact as described with every tooth of the lower clutch member.

Figure 8 shows the clutch members 5 and 6 of clutch A, and particularly the teeth 5' and 6' thereof, with their power-transmitting substantially helical surfaces in contact but closely approaching the disengaging position, having been separated in the direction of the axis for almost the depth of the teeth, and being still overlapped for the width of the narrow zone E in this figure. Treating this figure as looking toward the clutch axis in the direction of the plane X, the relation of both clutch members to this plane has been changed, the bottom clutch member having been rotated to the right, as seen in said figure, to bring the forward or upper end of the tooth substantially into the plane X, and the upper clutch member 5 having been rotated to the left, as seen in Figures 5 and 8, to substantially the same extent, to keep the teeth in contact, it being understood that in disengaging clutch member 5 moves forwardly relatively to clutch member 6 and tooth 5' passes over tooth 6'. In the position shown, plane X is the median plane of contact intersected by the section line 9—9; the power-transmitting surfaces 25 and 125 are still in contact throughout the overlap; and this contact is not reduced to a line contact until the teeth actually disengage. With the teeth formed in exact accordance with applicant's theory, there is no point contact of the generated surfaces or any contact less than a line contact comprising the full length of these surfaces substantially in the direction of a radius, at any time, the contact being reduced in direct correspondence with the relatively axial motion of the clutch members as they disengage and increased in direct correspondence to the relative motion of these members as they are engaged.

Figure 10 shows the tooth 5' in section on the line 10—10, Fig. 8, from the transmitting surface 125 of the same near the base or rear edge of the tooth at 131 to the plane X, the same, being on the left of the plane X of the clutch axis and, at the right of the line or plane X, this figure shows the surface 25 of the tooth 6' in plan.

Figures 2 and 11 to 15 illustrate the feasibility of combining and effecting the cooperation of the generated and/or substantially helical type of tooth of Figures 3 to 10, or suitable variations thereof, with the pin or other conventional type of tooth, at the same time maintaining a zone of contact which extends throughout the length of the tooth in the general direction of the radius and never becomes a point contact or a line contact at the outer radial ends of the teeth, both of which are illustrated in Figure 12 to be described and are found to be objectionable. Pin 16 is merely one conventional type of tooth.

Figure 11, being a sectional plan on the line 11—11 in Figure 2, shows the pin 16 in full engagement with the toothed clutch member 19 in the sense that the bottom of the pin at 16' is in engagement with the bottom 40 of the notch 41 between the teeth 42 and 43 of the clutch member 19, member 19 and pin 16 comprising clutch B. The power-transmitting surfaces 45 and 45' of the teeth 42 and 43 are shown as of the generated or substantially helical type, the opposite surfaces 44 and 44' being shown as of a conventional type mainly for convenience of illustration, the surfaces 44 and 44' being normally the back surfaces of the teeth which, in the regular operation of such tools, would not be used for the transmission of power unless there is a reversing device for driving left-hand screws, nuts, bolts, etc., or removing right-handed nuts, screws, bolts, and the like. The pin 16 is in contact with the bottom area of surfaces 45 and 45' throughout its length in what approaches a radial direction.

Fig. 12 shows the pin 16 in contact at its ends at 47 with the outer edges of the conventional tooth surfaces 44 and 44' in the manner which is regarded as objectionable in the regular operation of the tool, but harmless in the position in which these surfaces are shown, as it is not a normal working position in a tool not adapted to be reversed, and the majority of tools having means for left-handed driving or reversing are not extensively used in this way.

The point contact at 47 is due to the relative rotation of the clutch members as they are withdrawn one from the other, throwing the surfaces 44 and 44' out of contact with the pin 16, except at the outer ends, which would be in advance in the opposite rotation of the members, it being presumed for convenience of description that the locus of the contact is maintained in the same radial plane, the pin 16 having advanced over the tooth surface due to the inclination of the latter, the respective clutch members being thus treated as oppositely rotated to a slight degree as one is withdrawn from the other, maintaining the contact as previously described, particularly in connection with Figures 8 and 9. Figures 9 and 12 afford a good illustration of the full contact of the surfaces in applicant's improved device as against the point contact at the time of release with the conventional forms of teeth.

Figures 14 and 15 show the pin 16 in a position which may be treated as symmetrical in its relation to the radial plane G, the position shown being that of disengagement. In this position, the power-transmitting surface 45 has its top or forward element 50 parallel to the radial plane G and in contact with the bottom or forward edge of pin 16 throughout the radial length of the tooth. This top or forward edge 50 converges with the bottom edge 51 of surface 45 as the edges 30 and 31 converge in Figure 3; and, if extended toward and past the axis of the clutch, these lines and the surface between them would converge on a line parallel to the clutch axis and spaced outwardly therefrom transversely of the length of the pin 16 by half the diameter of the pin 16 instead of in the line of the axis as in the forms previously described. In this instance, the tooth surface 45, if extended to or beyond the axis of the clutch, would contain a line parallel to the clutch axis which would be the line Y of intersection of this extended surface 45 with an axial plane Y' at right angles to the pin. This line Y is the axis of helical or substantially helical surface 45, surface 45' having an axis at Y". These surfaces 45 and 45' are deflected from parallelism with the plane G of the axis of the clutch in uniform relation to the distance outwardly from the corresponding axis Y or Y' of the helix at the point where deflection is measured, the angle of the inner edge of the surface 45 indicated by reference character 52 with the plane G of the clutch axis being one-half the angle of the outer edge 53 with said plane when the length of the tooth surface in the direction of the length of the pin is one-half the radius at the outer edge 53. The surfaces 45 and 45', as shown, are radial at all points as to lines Y and Y''.

Figure 13 shows the pin 16 in full engagement with the clutch member 19, as in Figure 11. In this position, the tangent zone 54 of the bottom left-hand curve of the pin, as seen in Figure 13, is in contact with the near base portion of the transmitting surface 45 throughout the radial length of the tooth.

Figure 15 shows the relation of the pin to the clutch member at the time of release, the zone 54 being in full contact throughout the length of the tooth with the transmitting surface 45 up to the point of final release, thus avoiding the destructive point contact which has been designated as objectionable. A considerable variation of the precise arrangement as described is contemplated, other types of conventional teeth being substituted for the pin, and more or less distortion of the helical surfaces being possible without loss of all advantages of the invention.

In the operation of the invention it is important to note that in each screw or bolt-driving or nut-running operation, the clutches A and B, being engaged at the beginning of the operation, are more or less repeatedly disengaged and reengaged near the end of the operation when the point of release is reached, depending to a greater or less degree on the purpose and intent of the operator and on the accuracy of the overload release adjustment accomplished by means of the nut 12 in Figure 1 and the extent to which the operator desires to set the work beyond the torque determined by the adjustment.

In many instances, the rotary hammering action incident to the rapid successive disengagement and reengagement of the clutch in the dead spindle operation is employed to give additional tightening of the nuts or bolts; also the overload release usually performs a number of releasing and reengaging operations before the tool is withdrawn from the work, and may be considered as having a similar effect. Under these circumstances, the stress applied to the clutch surfaces is extremely heavy, and in the old form of teeth, disfigurement, deterioration, and partial destruction of the clutch teeth due to the spawling-off action previously described, take place long before there is any important deterioration of the other elements of the tool.

The final result is a badly battered jaw or tooth which is rounded over so that it often releases too quickly with corresponding loss of the overload adjustment. This is due in the old practice mainly to the point contact, as explained in the preamble, and further described in connection with the conventional tooth surfaces 44—44' on one side of the teeth in Figure 12. This difficulty is entirely avoided and overcome by the provision of the generated tooth surface.

In the form shown in Figures 1 and 3 to 10, the contact of the power-transmitting surfaces of the corresponding teeth of the opposed clutch members is complete to the full extent of their overlap and radial length in all driving positions up to the time of release, the contact at the time of release being reduced to a line contact for the full radial length of the tooth instead of a point contact. While the tooth described in connection with Figures 2 and 11 to 15 as shown does not give a full surface contact for the extent of the overlap, it provides contact throughout the radial length of the tooth and, this contact, by change of the conventional tooth or pin 16, may be increased or decreased in the direction of the axis. In the form shown, the zone of contact is of appreciable width. The contact at all times up to and including the point of release extends throughout the entire radial length of the tooth and never becomes a point contact. The arrangement, Figures 11 to 15, serves in a fairly satisfactory manner to eliminate the difficulty recited, though the use of two sets of teeth generated in accordance with the preferred form of the invention is regarded as giving a better result. The term "radial" in the description of the teeth B is used in a general sense rather than with a strictly limited meaning.

It will be understood, in view of the two forms of the invention illustrated, that various modifications of the clutch members and tooth surfaces may be effected within the scope of the invention without departure from the novel idea disclosed, and that the illustration of two forms of the tool are intended to identify the invention as relating to this general type of tool, not specifically excluding other forms of clutch-controlled mechanism.

I have thus described a preferred and modified form of the invention and the cooperating parts, the description being specific and in detail in order that the manner of constructing, applying, operating, and using the invention may be fully understood; however, the specific terms herein are used descriptively rather than in a limiting sense, the scope of the invention being defined in the claims.

I claim:

1. A clutch for use in the driving train of a portable power driven tool for driving screws, bolts and the like comprising a pair of toothed clutch members, one being movable relatively to the other in the direction of the clutch axis to engage and release the driving connection, the teeth of one member overlapping the teeth of the other member in the direction of the axis in the engaged position; one of said clutch members having teeth with substantially helical surfaces on their power-transmitting sides, the other clutch member having cooperating teeth adapted to engage said helical surfaces substantially throughout their radial length in all overlapping positions up to and including the position of release.

2. A clutch for use in the driving train of a portable power driven rotary tool, the clutch having its axis extending in the direction of the tool axis and comprising a pair of toothed clutch members mounted to move one relatively to the other in the direction of the tool axis in the engaging and releasing operation, the teeth of the respective members overlapping in the direction of the axis in engaged position; one of said clutch members having a power-transmitting surface substantially parallel to a radial line extending from said axis, said surface being spaced from the axis in a direction normal to said surface, and the cooperating clutch member having its cooperating power-transmitting surface arranged substantially in a helix formed about an axis parallel to the clutch axis and spaced outwardly from said axis by a distance substantially equal to the spacing of said first-mentioned tooth surface from said axis, the teeth of the respective members being in contact substantially throughout their radial length in all overlapping positions.

3. A toothed clutch for a portable power driven wrench or screw driver having a motor, a spindle driven by the motor through said clutch, said clutch connecting the motor to the spindle, the clutch comprising two toothed clutch members releasable in the direction of the spindle axis, the teeth having their power-transmitting surfaces helically arranged substantially about said axis.

4. A toothed clutch for a portable power driven wrench or screw driver having a motor, a spindle driven by the motor through said clutch, said clutch connecting the motor to the spindle, the clutch comprising two toothed clutch members releasable in the direction of the spindle axis, tooth surfaces on one of said members helically arranged about an axis substantially adjacent and parallel to said axis, the other of said members having teeth with driving surfaces substantially parallel to a single radius extending from the axis and adapted to contact the helical teeth surfaces of the former member substantially throughout their radial length in substantially all overlapping positions.

5. A clutch for a portable power-driven rotary tool for driving and setting screws and bolts and running nuts and the like, said clutch comprising two cooperating toothed members, one said member being mounted to move in the direction of the clutch axis, and having resilient means tending to release the clutch and maintain the same in normally disengaged position, to be engaged by pressure of the tool against the work; one of said clutch members having an engaging surface on the power-transmitting side of the tooth in substantially helical form about an axis extending substantially in the direction of the clutch axis, and a corresponding tooth surface of the other clutch member being shaped to cooperate with said helical surface, whereby contact is maintained throughout the radial length of the teeth in all driving positions and up to the point of release.

6. A clutch for a portable power-driven tool for driving and setting screws and bolts and running nuts and the like, said clutch comprising two cooperating toothed members, one said member being mounted to move in the direction of the clutch axis and having resilient means tending to release the clutch and to maintain the same in normally disengaged position, to be engaged by pressure of the tool against the work; the clutch teeth of both said members having cooperating curved surfaces on the power-transmitting faces of the teeth, the said surfaces being substantially helical in their arrangement substantially about the axis of said clutch.

7. Overload releasing and dead spindle clutch means, for a portable power driven tool for running nuts, driving screws and the like, said clutch means comprising a plurality of toothed clutch members mounted to move one relatively to the other in the direction of their axis, two cooperating overlapping teeth, one on each said member, having cooperating contacting, substantially helical power-transmitting surfaces, said surfaces being helically arranged about an axis extending in the direction of the clutch axis, the teeth on the respective clutch members being adapted to be engaged one with the other in full contact at all times throughout the area of the overlap of the clutch teeth and to maintain this contact throughout the radial length of the teeth up to the point of disengagement.

8. A jaw clutch for a portable power driven wrench or screw driver, comprising two jaw clutch members releasable in the direction of the clutch axis and having cooperating contacting power-transmitting surfaces on both said members which are substantially radial at all points of operative contact and inclined to said axis, said surfaces being engaged in all operative overlapping positions of the jaws throughout the radial length of said surfaces.

9. A jaw clutch for a portable power driven wrench or screw driver, comprising two jaw clutch members releasable in the direction of the clutch axis, and having a power-transmitting surface on one said member with its power-transmitting surface substantially radial at all points about a pre-determined axial line, said line being parallel to the clutch axis and spaced therefrom, said surface being inclined to said axis, and the other clutch member having a cooperating transmitting surface substantially parallel to a single radius of the clutch and adapted to engage the said surface of the other clutch member throughout its radial length in substantially all cooperating positions of the jaws.

10. A jaw clutch for inclusion in the driving train of a portable power driven rotary tool for driving and setting screws and bolts, running nuts and the like, said clutch comprising two cooperating toothed members, one said member being mounted to move in the direction of the clutch axis to engage and release the clutch; one of said clutch members having a surface adapted to engage the other clutch member in driving relation, said surface being substantially helical about an axis parallel to the axis of the clutch, and a corresponding surface on the other clutch member adapted to cooperate with said surface in driving relation and formed and arranged to maintain contact throughout an extended length of said surface in a substantially radial direction.

11. A jaw clutch for inclusion in the driving train of a portable power driven tool for driving and setting screws and bolts, and running nuts and the like, the same comprising two cooperating toothed members, one said member being mounted to move in the direction of the clutch axis and having resilient means tending to release the clutch, maintaining the clutch in normally disengaged position, to be engaged by pressure of the tool against the work; one of said clutch members having its engaging surface on the power-transmitting side of the tooth in substantially helical form about an axis substantially parallel to the length of the spindle, and a cooperating surface of the other clutch member being shaped to engage said helical surface in driving relation throughout an extended radial length of said surface in substantially all driving positions up to the point of release.

12. A jaw clutch for a portable power driven tool for driving screws and bolts and running nuts and the like, the same comprising two cooperating toothed members, one said member being mounted to move in the direction of the clutch axis; one of said clutch members having a surface adapted to engage the other clutch member in driving relation, said surface being substantially helical about an axis parallel to the axis of the clutch, an opposed surface of the other clutch member being in a substantially flat plane and substantially parallel to the clutch axis and spaced therefrom in close correspondence to the spacing of the axis of the helix from the clutch axis, an edge of said latter surface at and adjacent the area engaged at the time of release being inclined backwardly from the opposed helical surface.

GLENN C. WILHIDE.